United States Patent
Suk et al.

(10) Patent No.: US 11,436,866 B2
(45) Date of Patent: Sep. 6, 2022

(54) SYSTEM AND METHOD FOR EYE-TRACKING

(71) Applicant: VisualCamp Co., Ltd., Seoul (KR)

(72) Inventors: Yun Chan Suk, Seoul (KR); Tae Hee Lee, Seoul (KR); Seong Dong Choi, Seoul (KR)

(73) Assignee: VisualCamp Co., Ltd., Seoul (KR)

( * ) Notice: Subject to any disclaimer, the term of this patent is extended or adjusted under 35 U.S.C. 154(b) by 59 days.

(21) Appl. No.: 17/040,643

(22) PCT Filed: Apr. 9, 2019

(86) PCT No.: PCT/KR2019/004229
§ 371 (c)(1),
(2) Date: Sep. 23, 2020

(87) PCT Pub. No.: WO2019/199035
PCT Pub. Date: Oct. 17, 2019

(65) Prior Publication Data
US 2021/0019520 A1    Jan. 21, 2021

(30) Foreign Application Priority Data

Apr. 11, 2018  (KR) .................. 10-2018-0041921
Apr. 8, 2019   (KR) .................. 10-2019-0040684

(51) Int. Cl.
  *G06T 7/292*   (2017.01)
  *G06V 40/19*   (2022.01)
  *G06V 20/64*   (2022.01)

(52) U.S. Cl.
  CPC .......... *G06V 40/19* (2022.01); *G06T 7/292* (2017.01); *G06V 20/64* (2022.01)

(58) Field of Classification Search
None
See application file for complete search history.

(56) References Cited

U.S. PATENT DOCUMENTS

2013/0138499 A1   5/2013  Tu et al.
2017/0032214 A1*  2/2017  Krenzer ............... G06T 7/77
(Continued)

FOREIGN PATENT DOCUMENTS

JP    2018-010345 A    1/2018
KR    10-2011-0136012 A    12/2011
(Continued)

OTHER PUBLICATIONS

International Search Report for PCT/KR2019/004229 dated Jul. 23, 2019.

*Primary Examiner* — Idowu O Osifade
(74) *Attorney, Agent, or Firm* — The PL Law Group, PLLC

(57) ABSTRACT

A system for eye-tracking according to an embodiment of the present invention includes a data collection unit that acquires face information of a user and location information of the user from an image captured by a photographing device installed at each of one or more points set within a three-dimensional space and an eye tracking unit that estimates a location of an area gazed at by the user in the three-dimensional space from the face information and the location information, and maps spatial coordinates corresponding to the location of the area to a three-dimensional map corresponding to the three-dimensional space.

7 Claims, 7 Drawing Sheets

(56) References Cited

U.S. PATENT DOCUMENTS

| | | | | |
|---|---|---|---|---|
| 2017/0119298 A1* | 5/2017 | Cheung | ............. | G06K 9/00248 |
| 2018/0081434 A1* | 3/2018 | Siddiqui | .................. | G06K 9/00 |
| 2018/0330178 A1* | 11/2018 | el Kaliouby | ........ | B60W 50/082 |
| 2019/0213429 A1* | 7/2019 | Sicconi | ................... | G06F 3/016 |
| 2019/0246036 A1* | 8/2019 | Wu | .................... | G06K 9/00604 |
| 2019/0318181 A1* | 10/2019 | Katz | .................... | B60W 40/08 |
| 2020/0183492 A1* | 6/2020 | Siddiqui | ............ | G06K 9/00335 |
| 2020/0250488 A1* | 8/2020 | Linden | ................. | G06K 9/6262 |
| 2020/0326777 A1* | 10/2020 | Shoushtari | ............. | G06F 3/013 |

FOREIGN PATENT DOCUMENTS

| | | |
|---|---|---|
| KR | 10-2015-0029514 A | 3/2015 |
| KR | 10-2016-0031183 A | 3/2016 |

\* cited by examiner

SYSTEM AND METHOD FOR EYE-TRACKING

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/004229, filed Apr. 9, 2019, which claims priority to the benefit of Korean Patent Application Nos. 10-2018-0041921 filed on Apr. 11, 2018 and 10-2019-0040684 filed on Apr. 8, 2019 in the Korean Intellectual Property Office, the entire contents of which are incorporated herein by reference.

TECHNICAL FIELD

Embodiments of the present invention relate to an eye tracking technology.

BACKGROUND ART

Eye tracking is a technology that detects a user's eyeball movement to track a location of eyes, and methods such as an image analysis method, a contact lens method, and a sensor attachment method may be used. The image analysis method detects a pupil movement through an analysis of real-time camera image and calculates a direction of eyes based on a fixed location reflected on a cornea. The contact lens method uses reflected light from a mirror built-in contact lens, a magnetic field of a coil built-in contact lens, or the like, and is less convenient, but has higher accuracy. The sensor attachment method attaches a sensor around the eyes to detect an eyeball movement using a change in an electric field according to an eye movement, and can detect the eyeball movement even when the eyes are closed (sleep etc.).

In recent years, devices and fields targeted for application of an eye tracking technology are gradually expanding, and accordingly, attempts to utilize the eye tracking technology in collecting data such as a preferred product or service by tracking people's eyes are increasing.

However, the conventional eye gaze tracking technology has been limited to tracking user's eyes on a two-dimensional screen, and accordingly, there is a limit in providing various services through user's eye tracking in a three-dimensional space

SUMMARY

Technical Problem

Embodiments of the present invention are to more accurately track user's eyes in a three-dimensional space.

According to an exemplary embodiment of the invention, there is provided a system for eye-tracking including: a data collection unit that acquires face information of a user and location information of the user from an image captured by a photographing device installed at each of one or more points set within a three-dimensional space; and an eye tracking unit that estimates a location of an area gazed at by the user in the three-dimensional space from the face information and the location information, and maps spatial coordinates corresponding to the location of the area to a three-dimensional map corresponding to the three-dimensional space.

The data collection unit may acquire the location information of the user by using one or more of location coordinates of the photographing device, a location or size of the user in the image, and a distance between the photographing device and a terminal possessed by the user.

The face information may include one or more of a face location, pupil location, face vector, and pupil vector of the user.

The eye tracking unit may determine a location of an area corresponding to the location information in the three-dimensional space, grasp a point corresponding to the face location or the pupil location on the determined location of the area, and predict, as the location of the area gazed at by the user, a location of an object disposed in a direction in which the face vector or the pupil vector is directed from the grasped point.

Each of the photographing devices may be installed at different points in the three-dimensional space to capture the image.

The data collection unit may predict a movement trajectory of the user from the face information and the location information acquired from each image, and the eye tracking unit may predict an eye trajectory of the user from the movement trajectory, and the face information and the location information acquired from each image, and map spatial coordinates corresponding to the eye trajectory to a three-dimensional map corresponding to the three-dimensional space.

According to another embodiment of the present invention, there is provided a system for eye-tracking including: a data collection unit that acquires at least one of face information of a user, location information of a user, user number information, and human body information of a user from an image captured by a photographing device installed at each of one or more points set within a three-dimensional space; an eye tracking unit that estimates an eye gaze location of a corresponding user from the face information of the user and the location information of the user in the three-dimensional space; and an eye-related analysis unit that analyzes eye-related contents of the user based on one or more of the user number information, the human body information of the user, and eye gaze location information of the user are included.

The human body information of the user may include one or more of gender, age, race, and emotion of the user, and the eye-related analysis unit may analyze eye dwelling time individually for one or more of an age, gender, race, and emotion of a user for a predetermined object in a three-dimensional space based on the human body information of the user and the eye gaze location information of the user.

The eye-related analysis unit may analyze a ratio of a person who looked at a predetermined object to a floating population for the object in the three-dimensional space based on the user number information and the user eye gaze location information.

The eye-related analysis unit may determine to change the object to another object or to change a location of the object in the three-dimensional space when the ratio of the person who looked at the object to the floating population is less than or equal to a preset ratio for the object.

The eye-related analysis unit may analyze an eye distribution degree for each object in the three-dimensional space based on the user number information and the user eye gaze location information.

The user human body information may include one or more of gender, age, race, and emotion of the user, and the eye-related analysis unit may determine whether there is a harmful object at a point corresponding to a location gazed at by the corresponding user or whether the point is a preset prohibited zone or a dangerous zone, using one or more of the human body information of the user as a reference.

The user human body information may include one or more of the gender, age, race, and emotion of the user, and the eye-related analysis unit may extract one or more of eye dwelling time and the number of gazing eyes for a preset object or a preset zone of a corresponding user based on the user eye gaze location information and determine a risk index of a corresponding user based on one or more of the human body information of the user, the eye dwelling time, and the number of gazing eyes.

According to an exemplary embodiment of the invention, there is provided a method for eye-tracking including: acquiring face information of a user and location information of the user from an image captured by a photographing device installed at each of one or more points set within a three-dimensional space; estimating a location of an area gazed at by the user in the three-dimensional space from the face information and the location information, and mapping spatial coordinates corresponding to the location of the area to a three-dimensional map corresponding to the three-dimensional space.

In the acquiring, the location information of the user may be acquired by using one or more of location coordinates of the photographing device, a location or size of the user in the image, and a distance between the photographing device and a terminal possessed by the user.

The face information may include one or more of a face location, pupil location, face vector, and pupil vector of the user.

The estimating may include determining a location of an area corresponding to the location information in the three-dimensional space, grasping a point corresponding to the face location or the pupil location on the determined location of the area, and predicting, as the location of the area gazed at by the user, a location of an object disposed in a direction in which the face vector or the pupil vector is directed from the grasped point.

Each of the photographing devices may be installed at different points in the three-dimensional space to capture the image.

In the acquiring, a movement trajectory of the user may be predicted from the face information and the location information acquired from each image is predicted, in the estimating, an eye trajectory of the user may be predicted from the movement trajectory, and the face information and the location information acquired from each image, and in the mapping, spatial coordinates corresponding to the eye trajectory may be mapped to a three-dimensional map corresponding to the three-dimensional space.

According to embodiments of the present invention, face information of a user and location information of the user are acquired from an image captured by one or more photographing devices and the location of an area gazed at by the user in the three-dimensional space therefrom, thereby capable of tracking eyes of the user more accurately in the three-dimensional space.

Further, according to an embodiment of the present invention, the face information of the user and the location information of the user photographed by one or more photographing devices are acquired and a movement trajectory and eye trajectory of the user are predicted therefrom, thereby capable of grasping eye movement of the user more accurately in the three-dimensional space.

DETAILED DESCRIPTION

Hereinafter, specific embodiments of the present invention will be described with reference to the accompanying drawings. The following detailed description is provided to aid in a comprehensive understanding of a method, a device and/or a system described in the present specification. However, the detailed description is only for illustrative purpose and the present invention is not limited thereto.

In describing the embodiments of the present invention, when it is determined that a detailed description of known technology related to the present invention may unnecessarily obscure the gist of the present invention, the detailed description thereof will be omitted. In addition, terms to be described later are terms defined in consideration of functions in the present invention, which may vary depending on intention or custom of a user or operator. Therefore, the definition of these terms should be made based on the contents throughout this specification. The terms used in the detailed description are only for describing the embodiments of the present invention and should not be used in a limiting sense. Unless expressly used otherwise, a singular form includes a plural form. In this description, expressions such as "including" or "comprising" are intended to indicate any property, number, step, element, and some or combinations thereof, and such expressions should not be interpreted to exclude the presence or possibility of one or more other properties, numbers, steps, elements other than those described, and some or combinations thereof.

Figure 1:
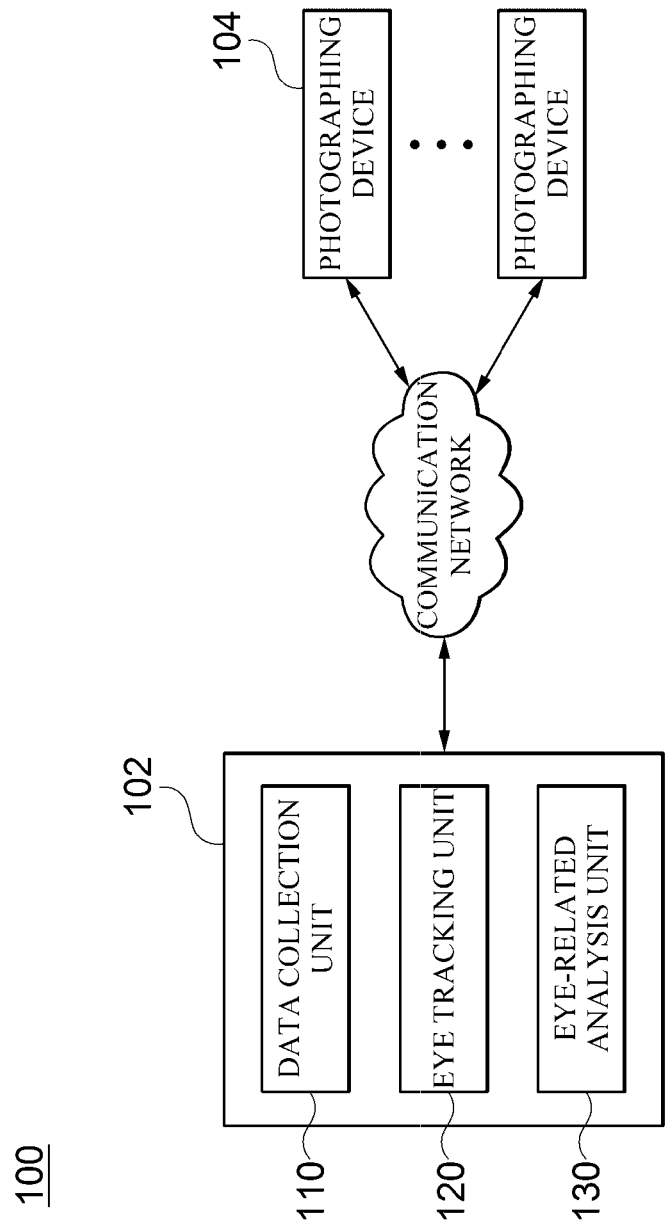
FIG. 1 is a block diagram illustrating a detailed configuration of a system for eye-tracking according to an embodiment of the present invention.

FIG. 1 is a block diagram illustrating a detailed configuration of a system for eye-tracking 100 according to one embodiment of the present invention.

Referring to FIG. 1, the system for eye-tracking 100 according to one embodiment of the present invention includes an eye tracking device 102 and a photographing device 104.

The eye tracking device 102 is communicatively connected to the photographing device 104 through a communication network. In some embodiments, a communication network 150 may include the Internet, one or more local area networks, wide area networks, cellular networks, mobile networks, other types of networks, or a combination of these networks.

The eye tracking device 102 may acquire one or more of face information of a user, location information of a user, user number information, and human body information a user from a captured of the photographing device 104. Here, the photographing device 104 may be installed at each of one or more points set in the three-dimensional space.

The photographing device 104 may be, for example, a camera, a camcorder, a closed circuit television (CCTV), etc. In an exemplary embodiment, an infrared camera may be used as the photographing device 104, but is not limited thereto. The photographing device 104 may be installed on, for example, a ceiling or structure in a building, an upper end portion of a kiosk, inside an elevator, inside a vehicle, a display stand, a concert, a lecture hall, a hypermarket, a shopping mall, a shopping mall, a restaurant, an airport, a subway, a children's house, a casino, a senior club, a factory, etc. Further, the photographing devices 104 may be respectively installed at different points in the three-dimensional space, and installation angles thereof may also be different. As an example, the photographing device 104 may be installed at each of one or more points set in the hypermarket to capture images of users of the hypermarket, and transmit the captured images to the eye tracking device 102.

The eye tracking device 102 may include a data collection unit 110, an eye tracking unit 120, and an eye-related analysis unit 130. In one embodiment, the data collection unit 110, the eye tracking unit 120, and the eye-related analysis unit 130 are implemented using one or more physically separated devices, or implemented by one or more processors or a combination of one or more processors and software, and may not be clearly distinguished in specific operations unlike the illustrated example.

The data collection unit 110 may acquire one or more of the face information of the user, the location information of the user, user number information, and the human body information of the user from an image captured by the photographing device 104.

Specifically, the data collection unit 110 may extract a face area and eye area of a user from the image using various rule-based algorithms or deep learning models, and acquire face information of the user from the extracted face area and eye area.

Here, the face information of the user may include one or more of a face location, face size, pupil location, face vector, and pupil vector of the corresponding user. Here, the rule-based algorithm is an algorithm acquire various data for eye tracking using a predetermined image processing technique, an image processing technique, or a mathematical expression, and may be, for example, face recognition algorithms (e.g., principal component analysis (PCA), linear discriminant analysis (LDA), etc.), face's feature point detection algorithms (e.g., support vector machine (SVM), speeded up robust features (SURF), etc.), an image-based head-tracking algorithm, an pupil extraction and pupil location coordinates calculation algorithm. Further, the deep learning model may be, for example, a convolutional neural network (CNN) model. The data collection unit 110 may acquire face information of the user, such as the face location, pupil location, face vector, and pupil vector of the user from a captured image using various rule-based algorithms, deep learning models, etc.

In an exemplary embodiment, the data collection unit 110 may recognize a person from the captured image. That is, the data collection unit 110 may recognize a person in the captured image and detect an area where the person is located. For example, the data collection unit 110 may recognize a person in the captured image and detect then area where the person is located using Fast area convolutional neural networks (RCNN) or Mask RCNN technique.

Next, the data collection unit 110 may check the number of people (the number) in the area where the person is located. The data collection unit 110 may receive the captured image periodically or in real time from the photographing device 104, and check the number of people from each captured image to analyze hourly floating population in the corresponding place (the place where the photographing device 104 is installed). The user number information may include the number of people included in each captured image and the hourly floating population in the corresponding place.

Further, the data collection unit 110 may recognize the face area of the person in the area where the person is located. The data collection unit 110 may acquire user human body information including one or more of gender, age, race, and emotion of the corresponding user based on the face area of the person. For example, the data collection unit 110 may acquire the user human body information including one or more of the gender, age, race, and emotion of the user based on the face area of the person using various rule-based algorithms or deep learning models.

Further, the data collection unit 110 may recognize a location of a main point (i.e., a landmark) (e.g., eyes, nose, and mouth) in the face within the face area of the person. The data collection unit 110 may extract a face size and face vector of the corresponding user based on a face area image of the person from among the captured image.

Further, the data collection unit 110 may detect an eye area based on a location of an eye point in the face. The data collection unit 110 may detect the pupil vector (eye vector) of the user based on an eye area image.

Further, the data collection unit 110 may acquire the location information of the user using one or more of location coordinates of the photographing device 104, a location of the user in the captured image, a size (or face size) of the user in the captured image, and a distance between the photographing device 104 and a terminal possessed by the user.

Figure 2:
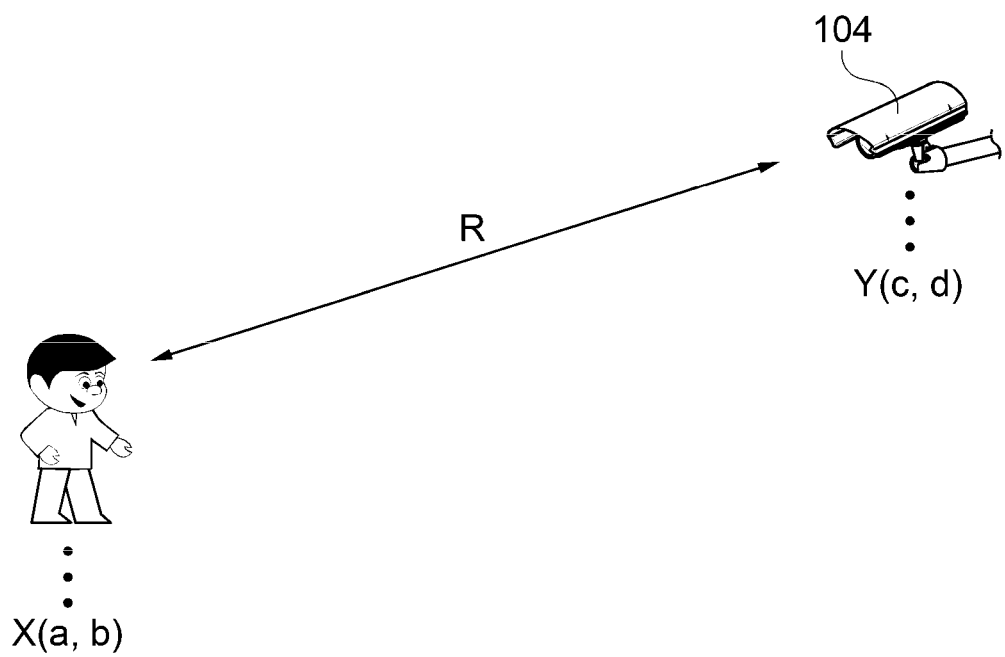
FIG. 2 is an example for illustrating a process of acquiring location information of a user by a data collection unit according to an embodiment of the present invention.
Figure 3:
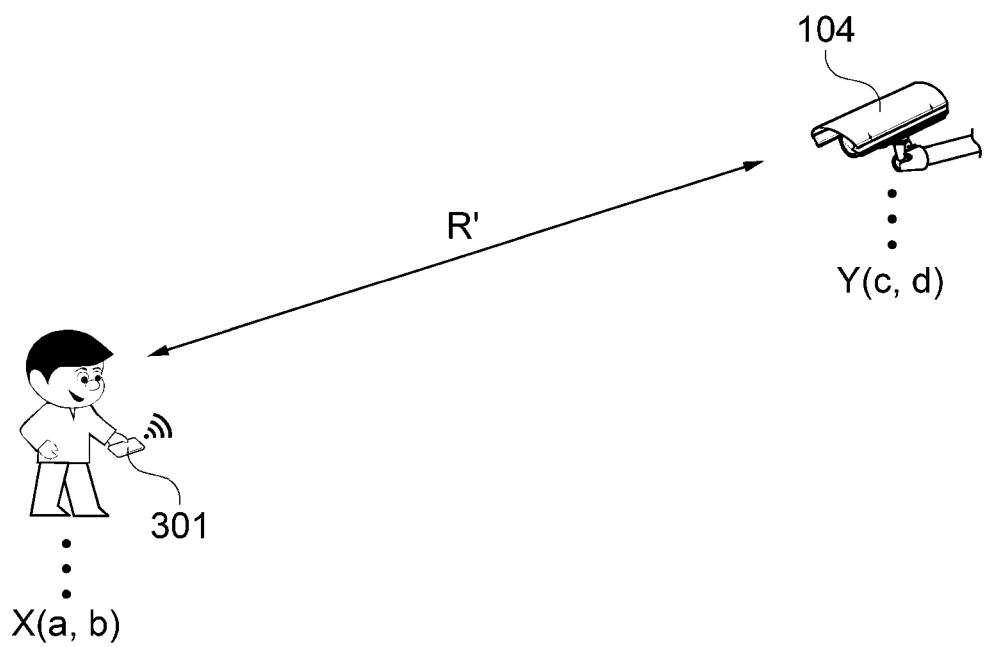
FIG. 3 is another example for illustrating a process of acquiring the location information of the user by the data collection unit according to an embodiment of the present invention.

FIGS. 2 and 3 are examples for illustrating a process of acquiring location information of a user by the data collection unit 110 according to an embodiment of the present invention.

As an example, referring to FIG. 2, when it is assumed that the user is located at an X point (a, b) and the photographing device 104 is located at a Y point (c, d), the data collection unit 110 may grasp the location and size of the user in the captured image and acquire the location information of the user (i.e., location coordinates (a, b) of the X point) therefrom. The data collection unit 110 may acquire the location information of the user based on an installation location and installation angle of the photographing device 104 and the location and size of the user in the captured image. In this case, since the installation location and angle of the photographing device 104 are fixed, the data collection unit 110 may be provided with location coordinates for each point in the image in advance. Further, the data collection unit 110 may predict a distance R between the photographing device 104 and the user according to the user size at each point in the image, and correct the location information of the user.

As another example, referring to FIG. 3, the user may move around with a terminal 301 such as a smartphone in a three-dimensional space. In this case, the terminal 301 and the photographing device 104 may be provided with a wireless communication module for signal transmission and reception, for example, a Bluetooth module, a Wi-Fi module, etc., and may transmit and receive a signal through the communication module. The data collection unit 110 may calculate a distance R' between the photographing device 104 and the terminal 301 through a signal exchanged between the photographing device 104 and the terminal 301. Further, the data collection unit 110 may grasp one or more candidate points corresponding to the location of the user in the captured image, and determine a location of a candidate point, which is separated by the distance R' from the location coordinates of the photographing device 104, among the candidate points, as a location of the user.

As another example, the data collection unit 110 may acquire location information of the user by receiving the location coordinates of the terminal 301 acquired through a GPS module of the terminal 301 possessed by the user. As such, the data collection unit 110 may acquire the location information of the user in various ways.

Returning to FIG. 1 again, the eye tracking unit 120 tracks a location of an area gazed at by the user in the three-dimensional space from the face information and location information of the user acquired by the data collection unit 110.

Specifically, the eye tracking unit 120 may determine a location (i.e., location of the user) corresponding to the location information of the user in the three-dimensional space, and grasp the face location or pupil location of the user on the location of user. Next, the eye tracking unit 120 may estimate, as the location of the area gazed at by the user, a location of an object disposed in a direction in which the face vector or pupil vector of the user faces is directed from the face location or pupil location of the user.

Figure 4:
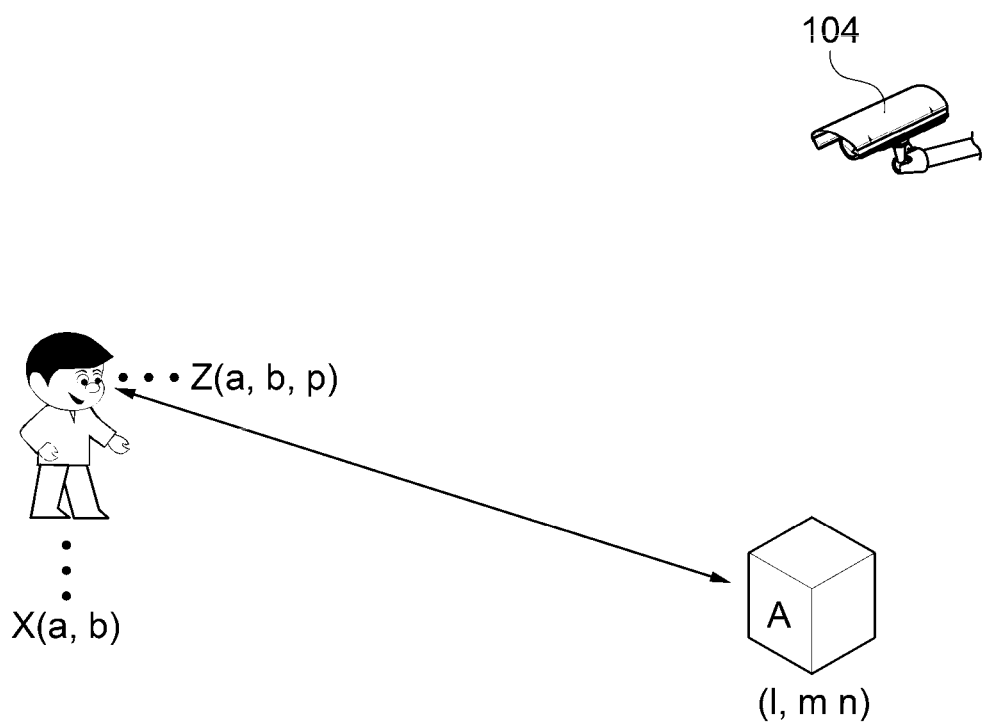
FIG. 4 is an example for illustrating a process of predicting a location of an area gazed at by a user according to an embodiment of the present invention.

FIG. 4 is an example for illustrating a process of estimating a location of an area gazed at by a user according to one embodiment of the present invention.

As an example, referring to FIG. 4, the eye tracking unit 120 may determine location information of the user acquired by the data collection unit 110, that is, a point X corresponding to the location coordinates (a, b) as an area where the user is located and grasp a point Z corresponding to the face location or pupil location of the user on the X point, that is, three-dimensional spatial coordinates (a, b, p).

Further, the eye tracking unit 120 may estimate, as the location of the area gazed at by the user, a location of an object A disposed in a direction in which the face vector or pupil vector of the user is directed from the grasped point Z, that is, three-dimensional spatial coordinates (1, m, n). Here, it is assumed that the eye tracking unit 120 is provided with three-dimensional spatial coordinates of each object disposed in the three-dimensional space in advance.

Further, the data collection unit described above may acquire a movement trajectory of the user from the face information and location information acquired from each image captured by the photographing devices 104 respectively installed at different points in the three-dimensional space. As an example, when an image of a user is sequentially captured at points A and B, the data collection unit 110 may estimate that the user has moved from point A to point B using face information and location information of the user acquired from the image captured at point A and face information and location information of the user acquired from the image captured at point B.

Further, the eye tracking unit 120 may track an eye trajectory of the user from the movement trajectory acquired by the data collection unit 110, and the face information of the user and the location information of the user acquired from each image captured by the plurality of photographing devices 104. Specifically, since the face location, pupil location, face vector, and pupil vector of the user, and the location information of the user changes each time the user moves, the location (user eye gaze location) of the area gazed at by the use can be estimated by tracking the eye trajectory of the user from the face information and the location information at each location according to the movement trajectory of the user.

Further, the eye tracking unit 120 maps spatial coordinates corresponding to a location of a place gazed at by the user in the three-dimensional space to a three-dimensional map corresponding to the corresponding three-dimensional space. Here, the three dimensional map is a map acquired by modeling the three-dimensional space, and may be provided with three dimensional spatial coordinates for each point.

Further, the eye tracking unit 120 may map spatial coordinates corresponding to the eye trajectory of the user to the three-dimensional map corresponding to the three-dimensional space. Specifically, the eye tracking unit 120 may track the eye trajectory of the user by sequentially mapping spatial coordinates corresponding to the location of the area gazed at by the user in the three-dimensional space to a virtual three dimensional map, and accordingly acquire and accumulate various data according to eye tracking from the user. In this case, when data acquired by eye tracking of a plurality of users is accumulated, big data may be formed, and the big data may be utilized in various services.

As an example, the eye tracking unit 120 may acquire data for each user by tracking the eyes of a plurality of users who have visited a hypermarket. In this case, data for each of the users may be accumulated to form big data related to a product preferred by visitors of the hypermarket, and the big data can be used as marketing information, such as increasing inventory for the preferred product or disposing the preferred product in a place well visible to people's eye. As another example, the eye tracking unit 120 may acquire data for each student by tracking the eyes of a plurality of students in a classroom during the course of a lecture. In this case, data for each of the students may be accumulated to form big data related to concentration of a lecture of students who listen to the lecture, and the big data may be used as lecture materials to increase concentration of a class.

The eye-related analysis unit 130 may analyze contents related to eyes of the user based on data acquired by the data collection unit 110 and the eye tracking unit 120. In an exemplary embodiment, the eye-related analysis unit 130 may analyze an eye dwelling time of the user for an object disposed in a three-dimensional space. That is, the eye-related analysis unit 130 may analyze the eye dwelling time of the user for an object based on information on a location (i.e., the location of the area gazed at by the user) of the object disposed in the direction in which the face vector or pupil vector of the user tracked by the eye tracking unit 120 is directed. In this time, the eye-related analysis unit 130 may analyze, which part of the object has been viewed and for how long for each user.

Further, the eye-related analysis unit 130 may analyze the eye dwelling time individually for one or more of the age, gender, race, and emotion of the user for a predetermined object in a three-dimensional space based on the human body information of the user and the user eye gaze location information.

Further, the eye-related analysis unit may analyze a ratio of a person who looked at a predetermined object to a floating population for the object in the three-dimensional space based on the user number information and the user eye gaze location information.

For example, when the object is a product on the display stand, an elevator advertisement, a taxi advertisement, an outdoor screen advertisement, etc., the eye-related analysis unit 130 may analyze the eye dwelling time of an object individually for each user (including individually for each use age, gender, race, emotion, etc.), and may analyze a ratio of a person who looked at the object to a floating population.

In this case, for the object, the eye-related analysis unit may determine to change the object to another object or to change a location of the object in the three-dimensional space when the ratio of the person who looked at the object to the floating population is less than or equal to a preset ratio.

Further, the eye-related analysis unit may analyze an eye distribution degree for each object in the three-dimensional space based on the user number information and the user eye gaze location information. That is, the eye-related analysis unit 130 may analyze information on what proportions of people present in the three-dimensional space are looking at each object. When such information is used, for example, it is possible to rearrange an arrangement of products on display stands by giving priority to the product with high interest of people. Further, since the eye distribution degree of people can be checked for each advertisement (i.e., object) location, it is also possible to readjust the advertisement location. The information analyzed by the eye-related analysis unit 130 may also be used to adjust the location of a milestone or warning message.

Further, the eye-related analysis unit 130 may extract the object having the highest eye distribution degree based on the eye distribution degree for the object in the three-dimensional space. When such information is used, for example, it is possible to give an effect such as a highlight to an object having the highest eye distribution degree in a lecture or performance.

Further, the eye-related analysis unit may determine whether the point corresponding to the location gazed at by the corresponding user is a harmful object (or a prohibited zone or a dangerous zone) using the age, gender, race, etc. of the user as a reference based on the user human body information and the user eye gaze location information. For example, the eye-related analysis unit 130 may determine whether the user is a child under 7 years of age, and whether the object that the user is looking at is a harmful object such as a knife. Further, the eye-related analysis unit 130 may take a measure (e.g., beep sound generation) to induce the eyes of the corresponding user to another place or to give a warning.

Further, the eye-related analysis unit may analyze a risk index of a corresponding user based on the user human body information and the user eye gaze position information. In an exemplary embodiment, when the user gaze location information corresponds to the installation location (or access restricted area, etc.) of the photographing device 104, the eye-related analysis unit 130 may check one or more of the eye dwelling time of the user and the number of gazing eyes to calculate the risk index of the user. For example, when a user of an adult male gazes the photographing device 104 for a predetermined time or more, or continuously watches for a predetermined number of times or more, the eye-related analysis unit 130 may determine that the risk index of the user is high.

Here, the eye-related analysis unit 130 may assign a user risk index score for each age, gender, race, and emotion in the user human body information. The eye-related analysis unit 130 may give a higher risk index score of the user as the user eye dwelling time and number of gazing eyes for a preset object (e.g., a photographing device, etc.) or a preset zone (e.g., a restricted access zone) increases. In this case, it is possible to prevent terrorism by extracting a person at high risk of terrorism in public places such as an airports or subways.

Figure 5:
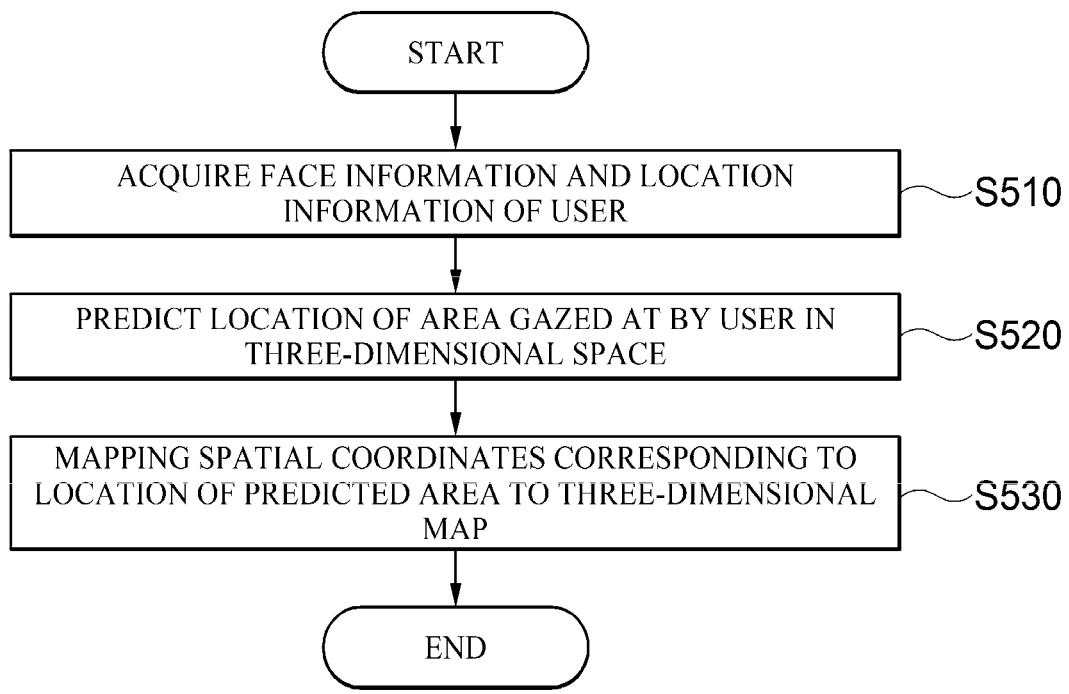
FIG. 5 is a flowchart illustrating a method for eye-tracking according to an embodiment of the present invention.

FIG. 5 is a flowchart illustrating a method for eye-tracking according to one embodiment of the present invention. The method illustrated in FIG. 5 may be performed, for example, by the system for eye-tracking 100 illustrated in FIG. 1.

First, the data collection unit 110 acquires face information of a user and location information of the user from an image captured by the photographing device installed at each of one or more points set in the three-dimensional space (S510). In this case, the face information of the user may include one or more of face location, pupil location, face vector, and pupil vector of the user. Further, each of the photographing devices may be installed at different points in the three-dimensional space to capture an image.

Next, the eye tracking unit 120 predicts a location of an area gazed at by the user in the three-dimensional space from the face information and the location information (S520).

Next, the eye tracking unit 120 maps spatial coordinates corresponding to the location of the area on a three dimensional map corresponding to the three-dimensional space (S530).

Meanwhile, in the flowchart illustrated in FIG. 5, the method or process is described as being divided into a plurality of steps, but at least some of the steps may be performed by changing the order, may be performed in combination with other steps, may be omitted, may be performed by being divided into detailed steps, or may be performed by adding one or more steps (not illustrated) thereto.

Figure 6:
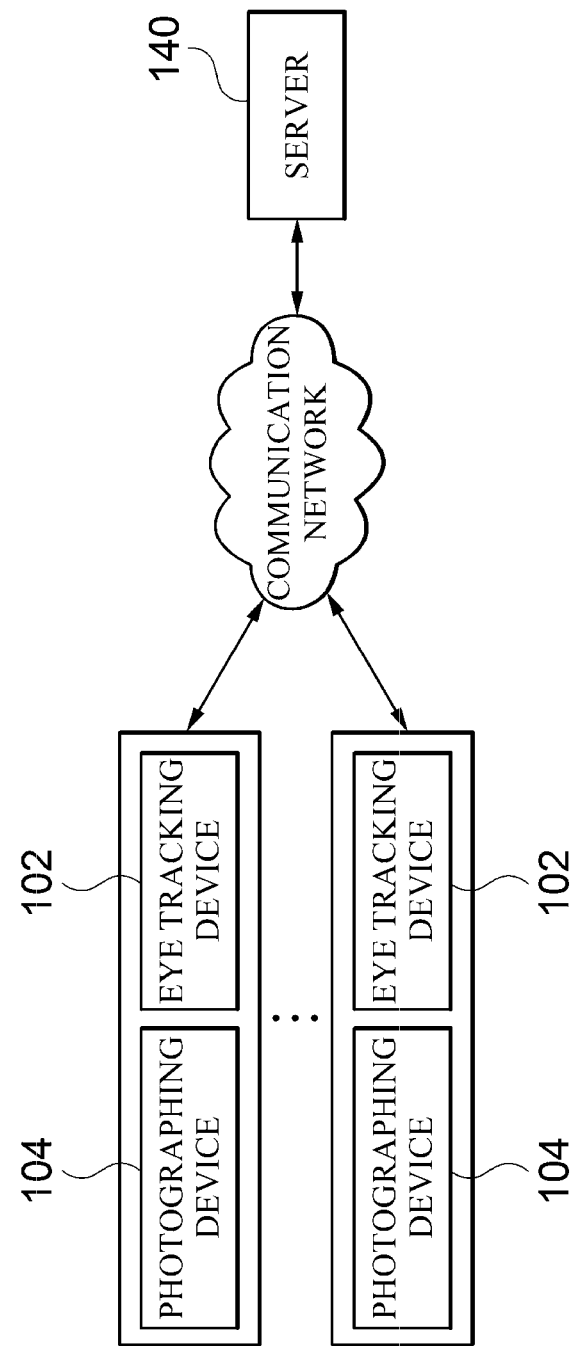
FIG. 6 is a diagram illustrating a configuration of a system for eye-tracking according to another embodiment of the present invention.

FIG. 6 is a diagram illustrating the configuration of the system for eye-tracking 100 according to another embodiment of the present invention. Here, the parts different from the embodiment illustrated in FIG. 1 will be mainly described.

Referring to FIG. 6, an eye tracking device 102 may be integrally installed at the same place as the photographing device 104. In an exemplary embodiment, the eye tracking device 102 and the photographing device 104 may be functionally distinguished from each other, but may be implemented by being physically integrated with each other.

Each eye tracking device 102 may transmit data (for example, face information of a user, location information of a user, user number information, and human body information of a user, location of an area gazed at by a user, spatial coordinates of a point gazed at by a user, and eye gaze-related analysis information, etc.) processed by the eye tracking device 102 to a server 140. However, the present invention is not limited thereto, and some configurations (for example, eye-related analysis unit 130) of the eye tracking device 102 may be implemented in the server 140.

Figure 7:
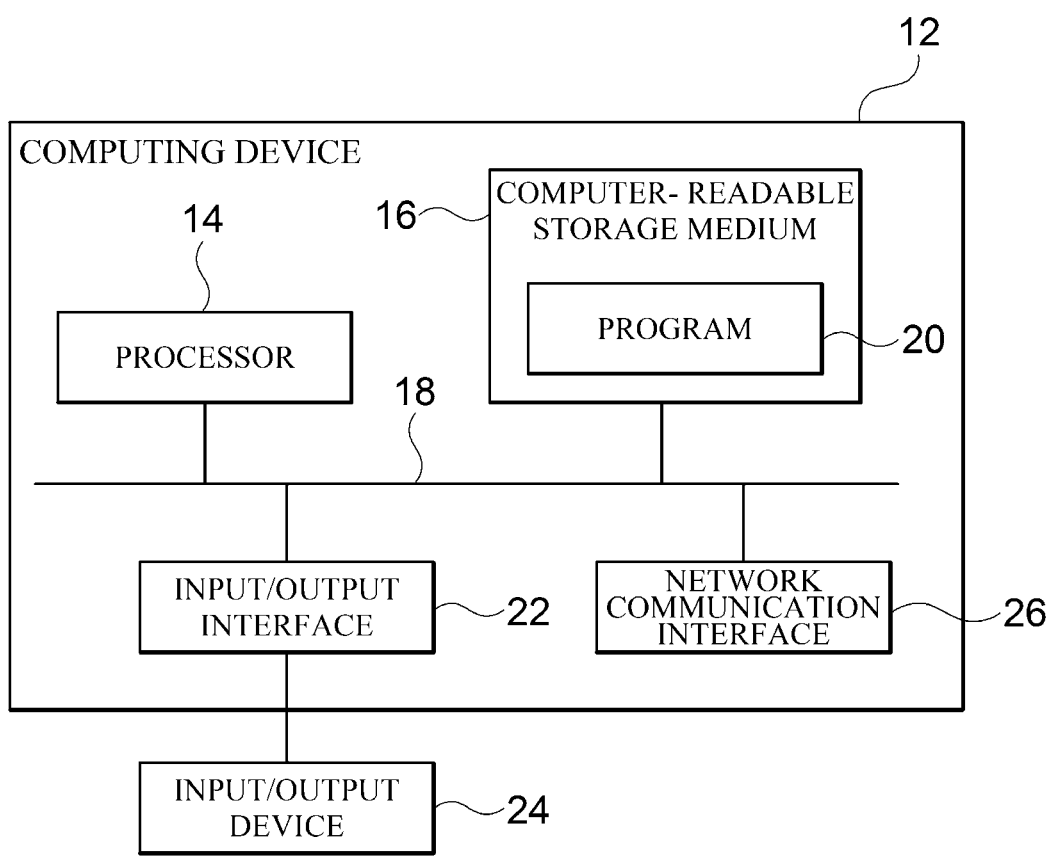
FIG. 7 is a block diagram for exemplarily illustrating a computing environment including a computing device suitable for use in exemplary embodiments.

FIG. 7 is a block diagram illustrating and exemplifying a computing environment 10 that includes a computing device suitable for use in the exemplary embodiment. In the illustrated embodiment, each component may have different functions and capabilities in addition to those described below, and additional components may be included in addition to those described below.

The illustrated computing environment 10 includes a computing device 12. In one embodiment, the computing device 12 may be the system for eye-tracking 100 or one or more components included in the system for eye-tracking 100.

The computing device 12 includes at least one processor 14, a computer-readable storage medium 16, and a communication bus 18. The processor 14 may cause the computing device 12 to perform steps according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform steps according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash Memory devices, other types of storage media that are accessible by the computing device 12 and store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 may include a scroll screen, an input interface, and an input screen. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display devices, a printer, a speaker, and/or a network card. The exemplary input/output device 24 may be included inside the computing device 12 as a component constituting the computing device 12, or may be connected to the computing device 12 as a separate device distinct from the computing device 12.

Although the exemplary embodiment of the present invention has been described in detail as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A system for eye-tracking, the system comprising:
   a data collection unit that acquires at least one of face information of a user, location information of a user, user number information, and human body information of a user from an image captured by a photographing device installed at each of one or more points set within a three-dimensional space;
   an eye tracking unit that estimates an eye gaze location of a corresponding user from the face information of the user and the location information of the user in the three-dimensional space; and
   an eye-related analysis unit that analyzes eye-related contents of the user based on one or more of the user number information, the human body information of the user, and eye gaze location information of the user, wherein the eye-related analysis unit analyzes an eye distribution degree for each object in the three-dimensional space based on the user number information and the user eye gaze location information.

2. The system of claim 1, wherein the human body information of the user comprises one or more of gender, age, race, and emotion of the user; and
   the eye-related analysis unit analyzes eye dwelling time individually for one or more of an age, gender, race, and emotion of a user for a predetermined object in a three-dimensional space based on the human body information of the user and the eye gaze location information of the user.

3. A system for eye-tracking, the system comprising:
   a data collection unit that acquires at least one of face information of a user, location information of a user, user number information, and human body information of a user from an image captured by a photographing device installed at each of one or more points set within a three-dimensional space;
   an eye tracking unit that estimates an eye gaze location of a corresponding user from the face information of the user and the location information of the user in the three-dimensional space; and
   an eye-related analysis unit that analyzes eye-related contents of the user based on one or more of the user number information, the human body information of the user, and eye gaze location information of the user, wherein the eye-related analysis unit analyzes a ratio of a person who looked at a predetermined object to a floating population for the object in the three-dimensional space based on the user number information and the user eye gaze location information.

4. The system of claim 3, wherein the eye-related analysis unit determines to change the object to another object or to change a location of the object in the three-dimensional space when the ratio of the person who looked at the object to the floating population is less than or equal to a preset ratio for the object.

5. The system of claim 1, wherein the user human body information includes one or more of gender, age, race, and emotion of the user; and
   the eye-related analysis unit determines whether there is a harmful object at a point corresponding to a location gazed at by the corresponding user or whether the point is a preset prohibited zone or a dangerous zone, using one or more of the human body information of the user as a reference.

6. The system of claim 1, wherein the user human body information comprises one or more of the gender, age, race, and emotion of the user; and
   the eye-related analysis unit extracts one or more of eye dwelling time and the number of gazing eyes for a preset object or a preset zone of a corresponding user based on the user eye gaze location information and determines a risk index of a corresponding user based on one or more of the human body information of the user, the eye dwelling time, and the number of gazing eyes.

7. A method for eye-tracking comprising:

acquiring at least one of face information of a user, location information of a user, user number information, and human body information of a user from an image captured by at least one photographing device installed at at least one point set within a three-dimensional space;

estimating an eye gaze location of a corresponding user from the face information of the user and the location information of the user in the three-dimensional space; and analyzing eye-related contents of the user based on one or more of the user number information, the human body information of the user, and eye gaze location information of the user, wherein the eye-related analysis unit analyzes an eye distribution degree for each object in the three-dimensional space based on the user number information and the user eye gaze location information.

\* \* \* \* \*